(12) United States Patent
Wüthrich

(10) Patent No.: US 8,776,672 B2
(45) Date of Patent: Jul. 15, 2014

(54) BREWING DEVICE FOR A COFFEE MACHINE

(75) Inventor: Christoph Wüthrich, Wiggiswil (CH)

(73) Assignee: Schaerer AG, Zuchwill (CH)

( * ) Notice: Subject to any disclaimer, the term of this patent is extended or adjusted under 35 U.S.C. 154(b) by 227 days.

(21) Appl. No.: 12/739,215

(22) PCT Filed: Oct. 8, 2008

(86) PCT No.: PCT/EP2008/063458
§ 371 (c)(1),
(2), (4) Date: Apr. 22, 2010

(87) PCT Pub. No.: WO2009/056426
PCT Pub. Date: May 7, 2009

(65) Prior Publication Data
US 2010/0307345 A1 Dec. 9, 2010

(30) Foreign Application Priority Data
Oct. 29, 2007 (EP) .................................... 07119488

(51) Int. Cl.
*A47J 31/44* (2006.01)
*A47J 31/30* (2006.01)
*A47J 31/06* (2006.01)
*A47J 31/40* (2006.01)
*A47J 31/36* (2006.01)

(52) U.S. Cl.
CPC .................................. *A47J 31/3619* (2013.01)
USPC ............. 99/289 R; 99/302 P; 99/295; 99/287

(58) Field of Classification Search
CPC .................................................... A47J 31/3619
USPC ............................ 99/295, 287, 289 R, 302 P
See application file for complete search history.

(56) References Cited

U.S. PATENT DOCUMENTS 5,307,734 A * 5/1994 Lussi et al. .................... 99/287
5,316,781 A * 5/1994 Lussi et al. .................... 426/433
(Continued)

FOREIGN PATENT DOCUMENTS

| EP | 0528758 A | 2/1993 | |
|---|---|---|---|
| EP | 528759 A1 * | 2/1993 | ............. A47J 31/40 |
| EP | 0538191 A | 4/1993 | |

OTHER PUBLICATIONS

International Search Report dated Sep. 2, 2009.

*Primary Examiner* — Henry Yuen
*Assistant Examiner* — Diallo I Duniver
(74) *Attorney, Agent, or Firm* — Pearne & Gordon LLP

(57) ABSTRACT

The invention relates to a brewing device (1) for a coffee machine, including a brewing cylinder (6) having a cylindrical bore and pistons, such that the brewing cylinder (6) can be closed off to form a brewing chamber. The brewing cylinder (6) and the pistons are held in a frame, and can be displaced relative to each other and driven by a spindle (9). A threaded part (7a) acts together with the spindle, and is disposed on a carrier (7) attached to the brewing cylinder (6). A ground coffee feed device is provided for filling the brewing chamber with ground coffee, and a stripping element (19) serves to strip off the residual coffee grounds remaining on the lower piston (4) after the brewing process. A supporting structure can prevent the spindle from being able to bend under load during the brewing process.

5 Claims, 7 Drawing Sheets

(56) References Cited

U.S. PATENT DOCUMENTS 5,333,537 A * 8/1994 Lussi et al. .................. 99/287
5,367,947 A * 11/1994 Lussi et al. .................. 99/287
5,406,882 A * 4/1995 Shaanan ...................... 99/287

* cited by examiner

BREWING DEVICE FOR A COFFEE MACHINE

This invention relates to a brewing device for a coffee machine, comprising a brewing cylinder with a cylindrical bore and an upper piston and a lower piston by means of which the brewing cylinder is able to be closed off to form a brewing chamber, the brewing cylinder and the piston being held in a frame in a way displaceable relative to each other and being drivable via a drive device, which drive device comprises a spindle provided with a trapezoidal threading, the ends of which are borne on both sides in a rotatable way in the frame, and a motor, in which trapezoidal threading of the spindle a threaded part engages on one side, which threaded part is disposed on a carrier provided on the lower piston and is displaceable in linear guides provided in the frame, a ground coffee feed device for filling the brewing chamber with ground coffee, and a stripping element for stripping of the ground coffee cake, ejected from the brewing chamber by the lower piston after the brewing step, into a collection vessel.

Brewing apparatuses of this kind are known in various designs, and are used both in household coffee machines and in restaurant coffee machines. To dispense a coffee, the required amount of usually freshly ground coffee, dependent upon which type of coffee is dispensed, such as normal coffee, espresso coffee, ristretto coffee, etc. is filled into the brewing chamber. The brewing chamber is closed afterwards, after which hot water is conducted at the desired pressure through the brewing chamber, coffee being brewed. The thus freshly brewed coffee then ends up, via an outlet, in the vessel provided. The brewing chamber is opened afterwards; the ground coffee residue located therein is ejected from the brewing chamber, and ends up in a vessel.

Such a brewing apparatus is known from EPA 0528 758 <U.S. Pat. No. 5,333,537>. Disposed for opening and closing of the brewing chamber is a spindle, which is drivable in rotation via a drive motor. Via this spindle, which is provided with a threading, the brewing cylinder is displaced along this spindle. For this purpose, the brewing cylinder is provided with a driver part, which is provided with a threaded part, which engages in the threading, and which wraps around a certain region of the spindle.

The spindle is provided on both sides at its ends with a bearing pin, which bearing pins are rotatably held in a sliding way in bearing rings, which are fixed in the frame of the brewing device. The spindle as well as the frame and the further components of the brewing device are composed of an abrasion-resistant plastic, in particular POM (polyoxymethylene), and are produced in an injection molding process. By means of this injection molding process, the individual parts can be manufactured in a relatively cost effective way. The threaded part is thereby integrated into the brewing cylinder, whereby this element can be produced in a simple way through injection molding technology. To also achieve this, the threaded part is designed such that it surrounds the spindle less than halfway. Likewise for production-oriented reasons, the threading on the spindle and the corresponding threading on the threaded part are designed as trapezoidal thread. The threading flanks are inclined accordingly.

During the brewing step for a coffee, i.e. when the brewing chamber is closed off by the two pistons, the threaded part provided on the lower piston is situated in a central region of the spindle, borne at its ends on both sides. During the brewing step, the water is pressed through the brewing chamber at a pressure of about 8 bar, which means that a relatively large amount of pressure also acts upon the lower piston, which is supported via the threaded part and the spindle. Through the inclined threading flanks of the trapezoidal threads a force component arises on the spindle, which force acts transversely with respect to the axis thereof and which is able to push the spindle away from the threaded part. Owing to the production-oriented choice of material, the spindle has a certain elasticity, so that under the influence of these components of force, a bending of the spindle results. A pushing away of the spindle out of the threaded part of the brewing cylinder owing to the trapezoidal threading has the consequence that the brewing cylinder is able to be lowered with the lower piston in relation to the stationary upper piston, whereby the brewing chamber and the conditions prevailing therein are able to be changed, which is not desired.

The object of this invention is thus to hold the spindle in the frame in such a way that a bending of the spindle during the brewing step is prevented.

This object is achieved in that the spindle is supported by support means in the region opposite the threaded part, which support means are attachable on the frame.

Prevented by providing these support means on the frame of the brewing device is that the spindle is bent. The engagement of the trapezoidal threading is thus optimal in the corresponding threading of the threaded part provided on the brewing cylinder, in particular during the brewing step. A pushing away of the brewing cylinder with the lower piston is thereby avoided.

Preferably, the support means are formed by a plate, which plate is attached to the frame on both sides, and which has a support surface which is turned toward the trapezoidal threading of the spindle. A simple and economical design for the support means is thereby achieved.

Preferably, the support surface is provided with a curve having a smooth cylindrical surface, which curve corresponds substantially to the outer surface of the trapezoidal threading of the spindle. The outer surface of the trapezoidal threading of the spindle can be thereby supported in an optimal way on this smooth curve, with a cylindrical surface, of the plate and without any large amount of friction being generated; the area load is minimal.

The smooth cylindrical curve of the support surface surrounds the outer surface of the trapezoidal threading of the spindle by about one fourth of the circumference, whereby an optimal support effect is achieved.

Preferably, the support means are produced from a resistant plastic, for instance POM (polyoxymethylene).

A further advantageous embodiment of the invention consists in that the support means are attached to the frame in such a way that, with the brewing chamber closed by the upper piston and the lower piston, the support means come to be situated opposite the threaded part. The support is thus optimal during the brewing step for a coffee.

An embodiment of this invention will be explained more closely in the following, by way of example, with reference to the attached drawing.

Figure 1:
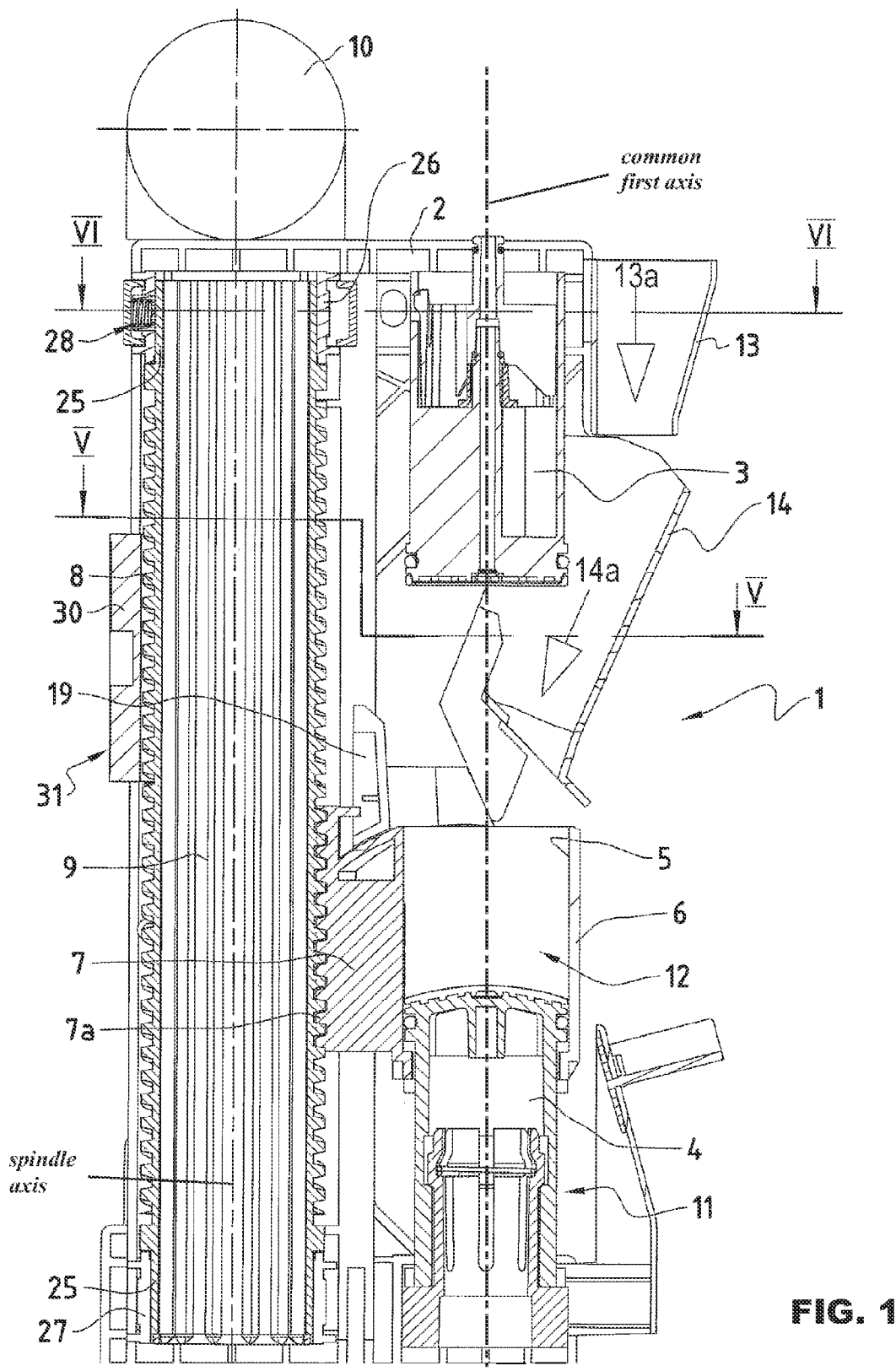
FIG. 1 shows a sectional representation of a brewing device of a coffee machine during the step of filling of the ground coffee into the brewing chamber.

As can be seen from the FIGS. 1 to 4, the brewing device 1 comprises an upper piston 3, held in a stationary way in the frame 2. Disposed situated axially opposite the upper piston 3 is a lower piston 4, which is axially displaceable with respect to the upper piston 3. This lower piston 4 is held in a cylindrical bore 5 of a brewing cylinder 6, which brewing cylinder 6 is likewise axially displaceable. The brewing device 1 comprises a single brewing cylinder 6 as shown in the drawings. The brewing cylinder 6 is provided with a carrier, on which a threaded part 7a is provided, which threaded part 7a is engaged with a trapezoidal threading 8 of a spindle 9 held in a rotatable way in the frame 2. This spindle 9 has on the ends on both sides one bearing pin 25 each, which are rotatably held in a sliding way in bearing rings 26 and 27 provided in the frame 2. Inserted in the bearing ring 26 is a bearing element 28 with which the play between bearing pin 25 and bearing ring 26 is eliminated. The spindle 9 is drivable in a known way via an electromotor 10, which is likewise installed on the frame.

Attached to the frame is a plate 30 forming the support means 31 with which the spindle 9 is supported such that a bending away is prevented of this spindle from the threaded part 7a of the carrier 7, which is integrated into the brewing cylinder 6. This support means 30 is attached on the frame in the central area between the upper and lower bearing of the spindle, as will still be described later on.

Shown in FIG. 1 is the brewing device 1 in the filling position. This means that the lower piston 4 is to be found in the lowermost position, in which it is held by the locking device 11. This position has been achieved by the lower piston 4 in that the brewing cylinder 6 has likewise been brought into the lowermost position via the spindle 9 through corresponding rotation, into which position the lower piston 4 is entrained, until it is locked into the locking device 11. Afterwards the brewing cylinder 6 is driven up again through corresponding rotation of the spindle 9, as can be seen in FIG. 1. The lower piston thereby remains in the lowermost position. The brewing cylinder 6 has thus been raised with respect to the lower piston 4, whereby formed inside the brewing cylinder is the brewing chamber 12, closed off downward by the lower piston 4. In this filling position, the stripping element 19 is located in its resting position over the carrier 7.

Now fed into the brewing chamber 12 is the freshly ground coffee. This ground coffee is ground in a known way in a coffee mill, which is not shown and which is likewise housed in the respective coffee machine. Via a first funnel 13, the ground coffee powder travels in a direction 13a and reaches a pivotable funnel 14, through which the ground coffee is conducted in a direction 14a into the brewing chamber 12. The amount of ground coffee supplied is thereby metered in a known way, depending upon which type of coffee is supposed to be dispensed.

Figure 2:
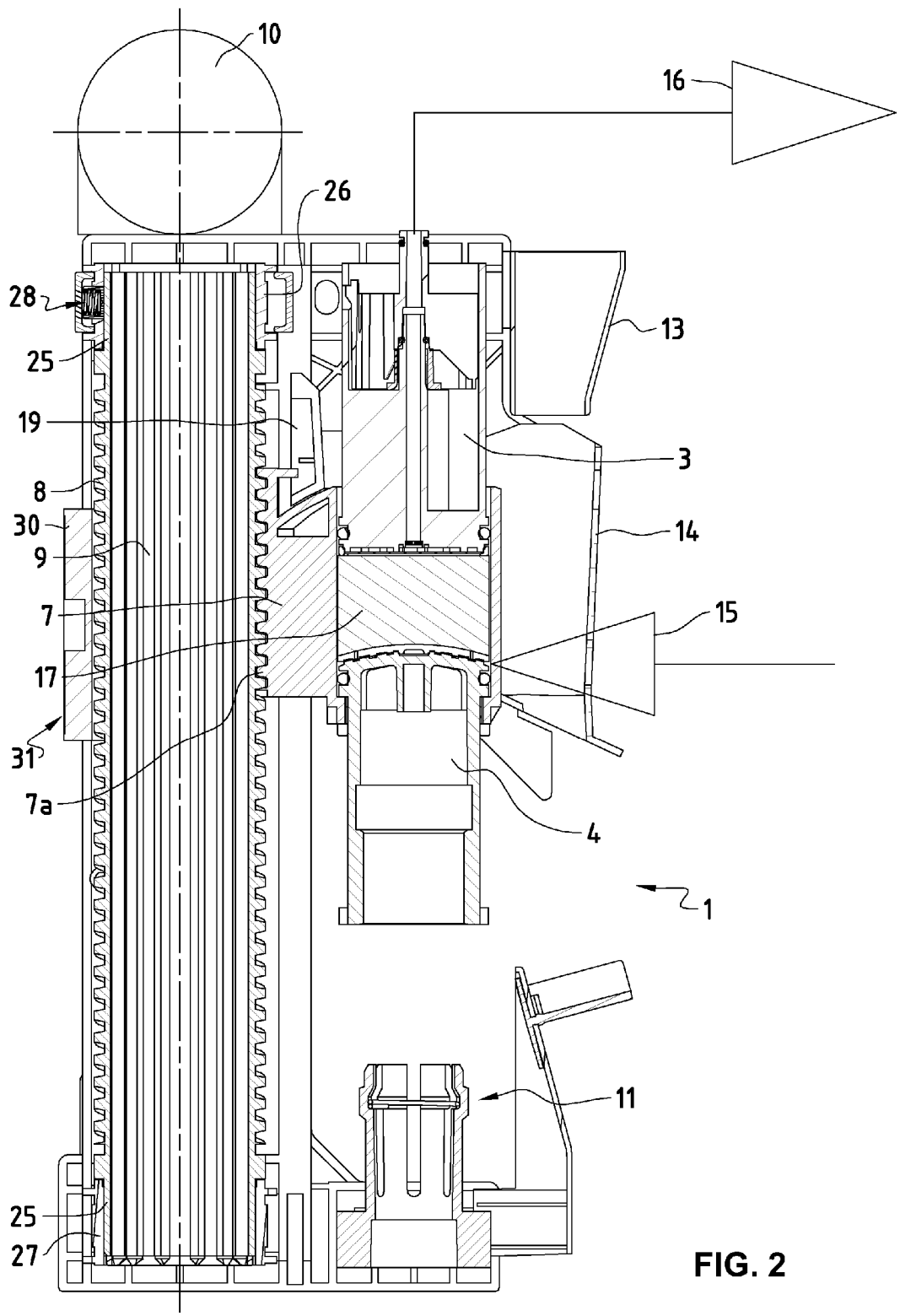
FIG. 2 shows a sectional representation of the brewing device with closed-off brewing chamber during the brewing step for a coffee.

After filling of the brewing chamber 12 with freshly ground coffee, the spindle 9 is set in rotation via the electromotor 10. By way of the threaded part 7a on the carrier 7, the brewing cylinder 6 is driven upward, the lower piston 4 being taken along via corresponding carriers. The brewing cylinder 6 and the lower piston 4 are driven upward until the brewing chamber 12 is closed off by the upper piston 3, and the ground coffee located in the brewing chamber 12 is pressed. In this position of the brewing cylinder 6, which is shown in FIG. 2, the brewing position is reached. In a known way, the hot water can now be supplied from below into the brewing chamber 12, as is shown by arrow 15. The hot water flows through the brewing chamber 12 and the ground coffee located therein, and is led off as brewed coffee, as shown by arrow 16, via a discharge channel, provided in a known way in the upper piston 3, and ends up in a known way via a line (not shown) in an outlet of the coffee machine and from there in the vessel made available underneath. For brewing of the coffee, the ground coffee located in the brewing chamber 12 is compressed between the two pistons 3 and 4 in such a way that this offers resistance to the brewing water flowing through, so that the brewing water now has to be forced through the brewing chamber at a pressure of about 8 bar. The completely brewed ground coffee remains in the brewing chamber 12 and forms a ground coffee cake, which is very compact and moist.

As can be seen from FIG. 2, the pivotable funnel 14 is pivoted away during raising of the brewing cylinder 6 with the lower piston 4. This pivotable funnel 14 here is provided with a spring (not shown), which is able to push the pivotable funnel 14 back into the position shown in FIG. 1.

Figure 3:
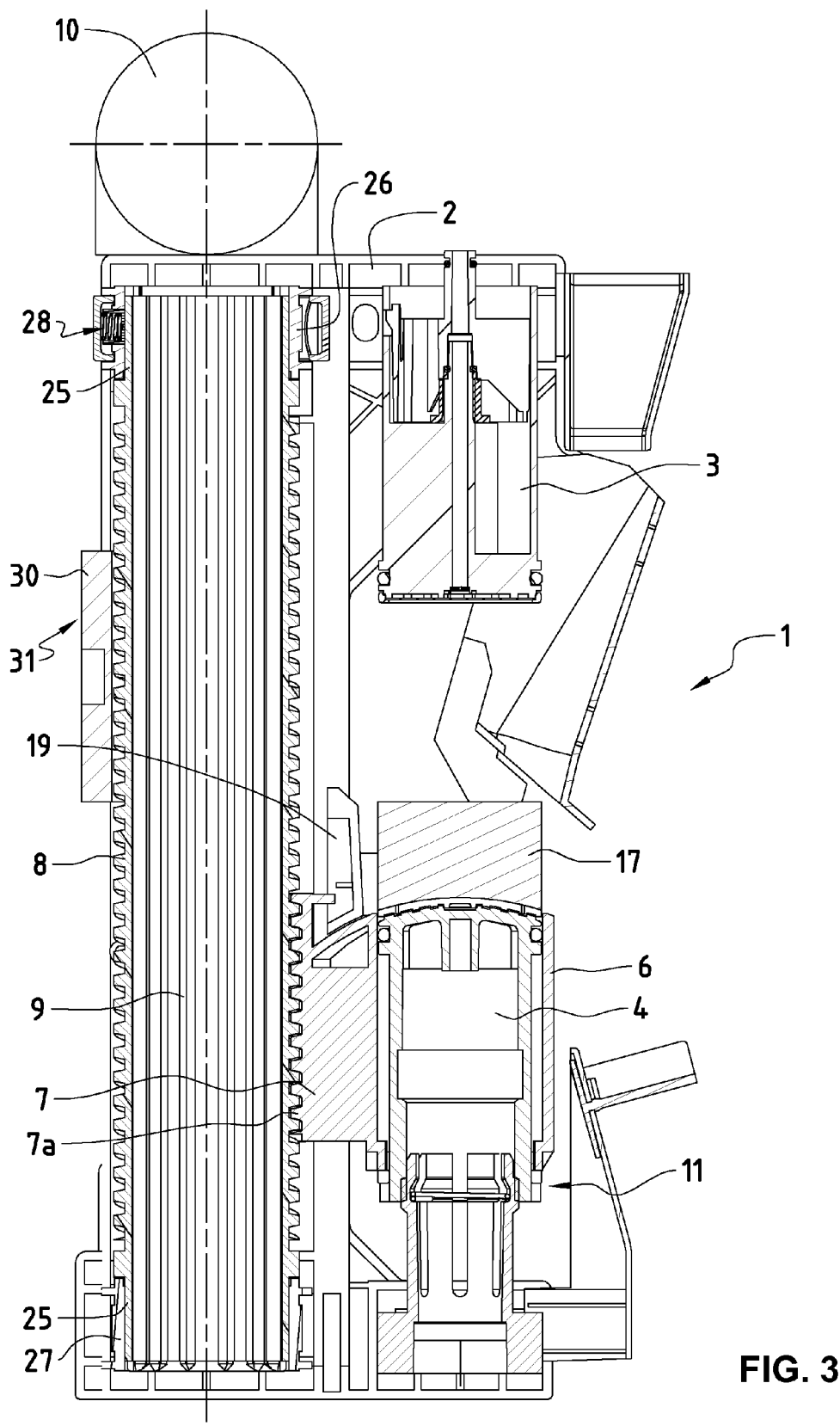
FIG. 3 shows a sectional representation of the brewing device with opened brewing chamber and through the ground coffee cake ejected by the lower piston.
Figure 4:
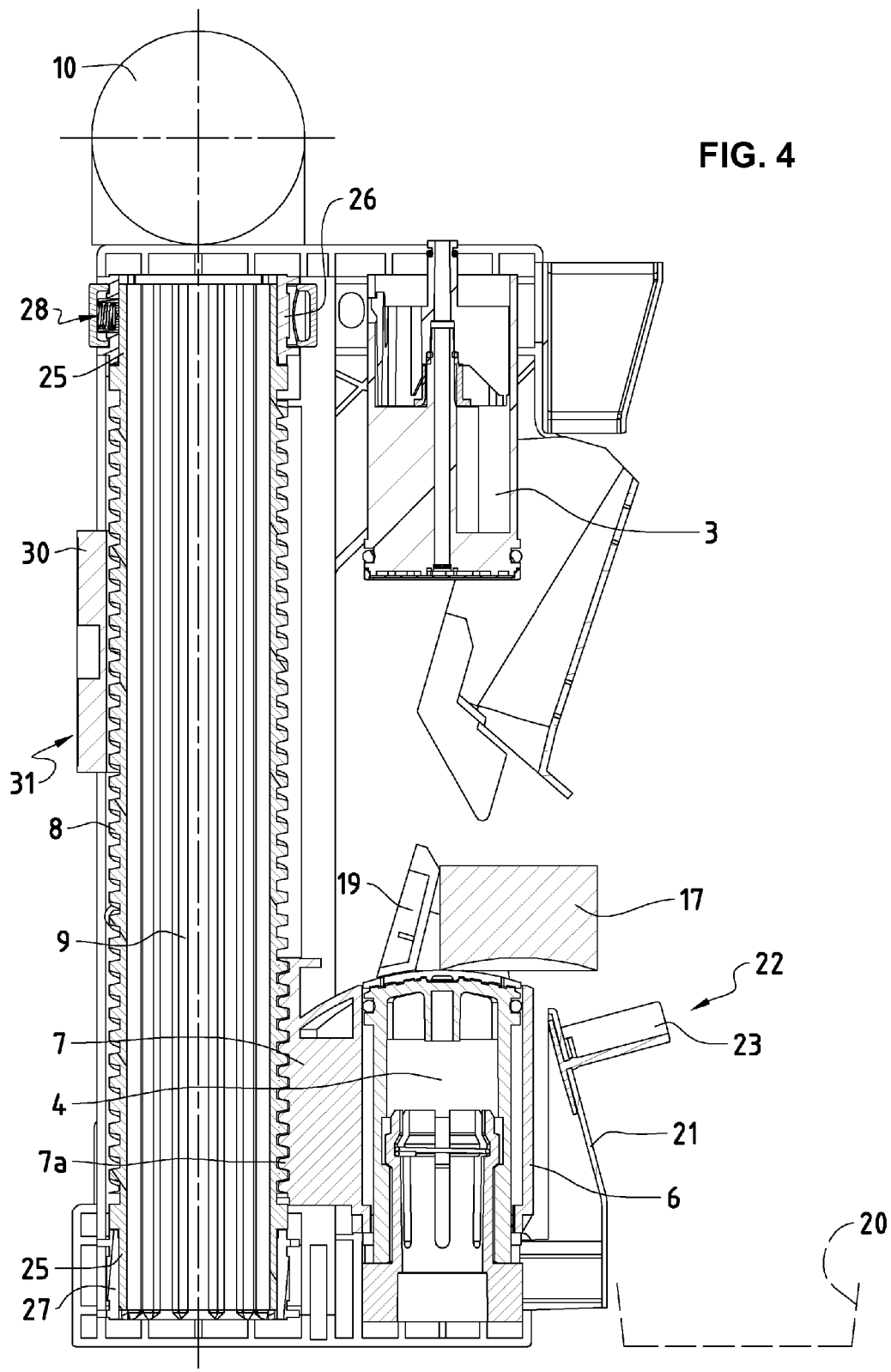
FIG. 4 shows a sectional representation of the brewing device with stripping of the ground coffee cake beginning by the stripping device.

After the brewing step is carried out, the brewing chamber 12 is opened in that the brewing cylinder 6, and the lower piston 4 is driven downward by corresponding rotation of the spindle 9, as is shown in FIG. 3. The lower piston 4 thereby reaches, with its lower end, the locking device 11, and supports itself thereon. The brewing cylinder 6 is driven further downward. The lower piston stands still, whereby the ground coffee cake 17 is ejected from the brewing cylinder 6, as can be seen in FIG. 3. When the brewing cylinder 6 has reached, with its upper edge, the upper side of the lower piston 4, the ejected ground coffee 17 rests on the lower piston 4. The lower piston 4 is carried along with the brewing cylinder 6, drivable further downward, via corresponding stops and is driven into the locking device 11, as is shown in FIG. 4. When the brewing cylinder 6 and the lower piston 4 arrive in the region of the lower position, the stripping element 19, which is coupled in a known way to the brewing cylinder 6, is actuated mechanically via a known connecting link (not shown), installed on the frame 2. The stripping element thereby moves transversely over the lower piston 4. The ground coffee cake 17 is stripped from the lower piston and the brewing cylinder 6, as can be seen from FIG. 4.

Via a chute 21, which is installed on the frame 2, the ground coffee cake 17 to be ejected thereby arrives in a container 20, shown only schematically and accommodated in the coffee machine. Mounted on the chute 21 is a subcomponent 22, which in this embodiment example is designed as blade 23, by means of which the ground coffee cake 17 arriving in the container 20, via the chute 21, is cut up into smaller pieces.

After the ejection of the ground coffee cake 17, the brewing cylinder 6 can be brought into the filling position again by corresponding rotation of the spindle 9, as is shown in FIG. 1. The brewing device is ready to brew another coffee.

Figure 5:
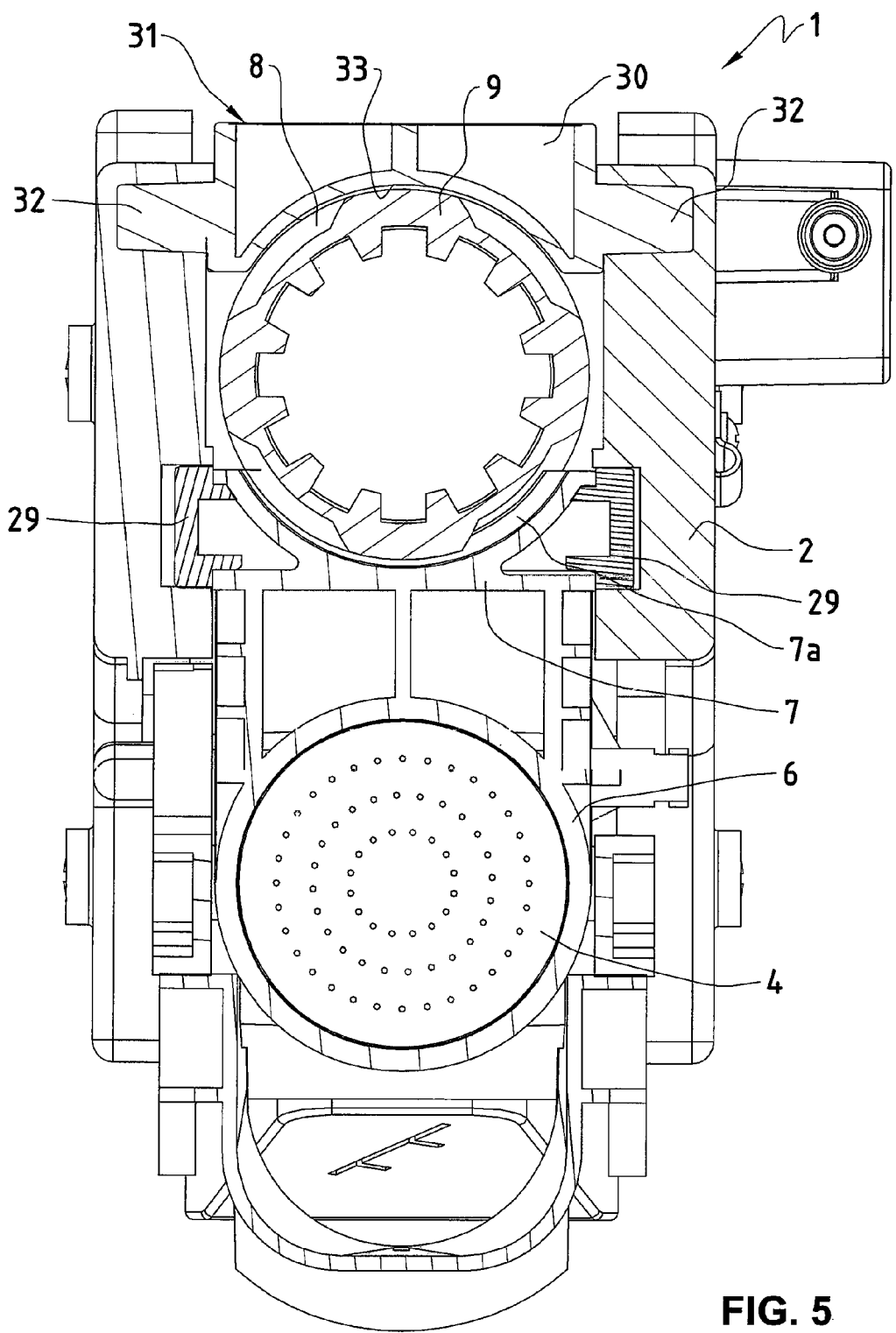
FIG. 5 shows a sectional representation through the brewing device along line V-V according to FIG. 1.

Visible from FIG. 5 is the spindle 9 disposed in the frame 2 of the brewing device 1, which spindle is provided with the trapezoidal threading 8 into which the corresponding threading engages of the threaded part 7a of the carrier 7. In a known way, the carrier 7 is guided in the frame by means of linear guides 29 in a longitudinally displaceable way along an axis ("common first axis" in FIG. 1) that is parallel to the axis of the spindle 9 ("spindle axis" in FIG. 1). Installed on the carrier 7 is the brewing cylinder 6, in which the lower piston 4 is disposed. The threaded part 7a of the carrier 7 surrounds the spindle 9 in the embodiment example shown here by about 120°. The two trapezoidal threads are engaged via this region.

The brewing cylinder and the pistons are held in the frame in a way displaceable along the common first axis relative to each other and being able to be driven via a drive device, which drive device comprises the spindle with the spindle axis lying parallel to and at a predetermined distance from the common first axis.

In the area opposite the threaded part 7a of the carrier 7, the spindle 9 is supported by the support means 31 against bending away from the threaded part 7a. This support means is substantially composed of a plate 30, which extends across the spindle 9 from one side wall to the other of the frame 2. This plate 30 is provided on both sides with protrusions 32, which protrude into recesses provided correspondingly on the frame 2, whereby the plate 30 is held in the frame 2 via these protrusions 32. The plate 30 is provided with a support surface 33, which is turned toward the trapezoidal threading 8 of the spindle 9. This support surface 33 is provided with a smooth cylindrical curve which corresponds substantially to the outer surface of the trapezoidal threading 8 of the spindle 9. This cylindrical curve of the support surface 33 surrounds the trapezoidal threading 8 of the spindle 9 by about one fourth of the circumference of the spindle 9. By way of this smooth cylindrical curve of the support surface 33 of the plate 30, the spindle 9 in prevented in an optimal way from bending out away from the threaded part 7a.

Figure 6:
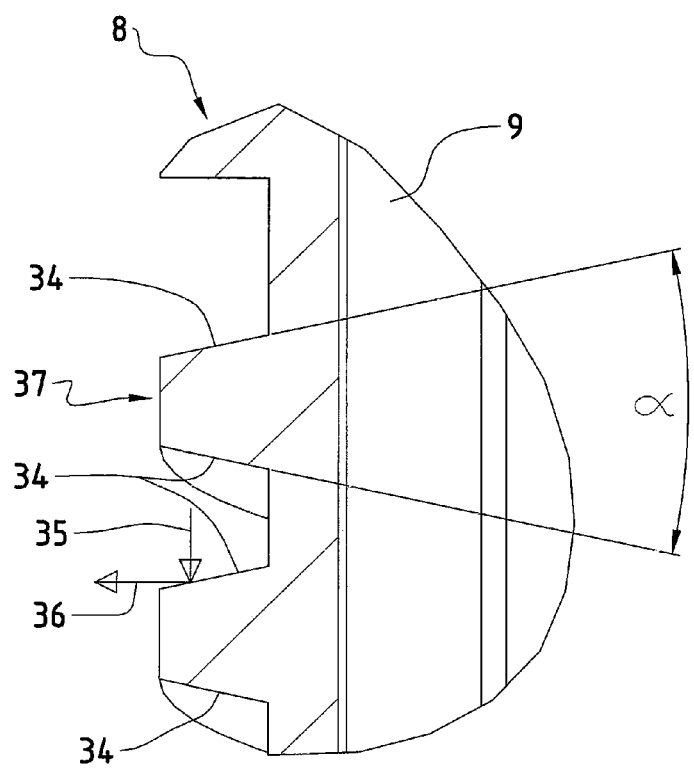
FIG. 6 shows, in an enlarged diagrammatic representation, a portion of the trapezoidal threading of the spindle.

A portion of the trapezoidal threading 8 of the spindle 9 is shown by FIG. 6, enlarged. The thread surfaces 34, opposite each other in each case, of the trapezoidal threading 8 enclose between themselves an angle $\gamma$, which amounts to 24° in the present embodiment example. With a vertical load bearing by the threaded spindle 9, indicated by the arrow 35, a horizontal force component results, based on the inclination of the thread surfaces 34, indicated by arrow 36, which has the consequence that the spindle is able to undergo a lateral buckling upon acceptance of the load exerted on the lower piston during the brewing step, which buckling is prevented by the support means 31 (FIG. 5), which reinforces the outer surface 37 of the trapezoidal threading 8. Thereby prevented is that the lower piston 4 is able to move downward away from the upper piston during the brewing step, as is shown in FIG. 2, owing to the bending out of the spindle 9.

Figure 7:
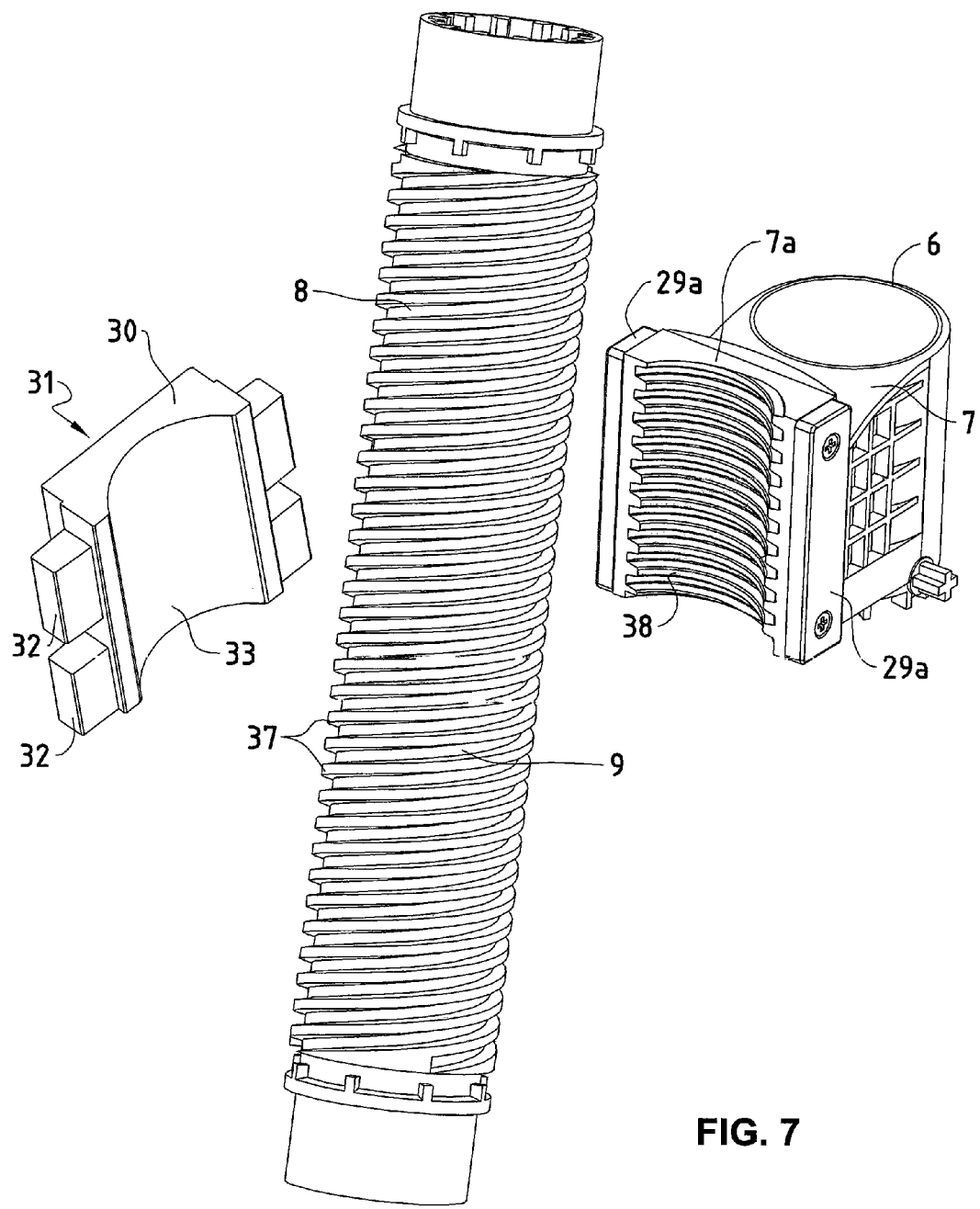
FIG. 7 shows in a spatial representation the brewing cylinder with integrated threaded part and the support means in taken-apart position.

FIG. 7 shows the plate 30 acting as the support means 31, which plate is provided with protrusions 32, which are held in the frame of the brewing device, as already mentioned. This plate 30 has the support surface 33, which is provided with the smooth cylindrical curve. This curve with a cylindrical surface corresponds to the outer surface 37 of the trapezoidal threading 8 of the spindle 9.

Likewise shown in FIG. 7 is the brewing cylinder 6, which is provided with the carrier 7 on which the threaded part 7a is attached. The threaded part 7a is also provided with a trapezoidal threading 38, which corresponds to the trapezoidal threading 8 of the spindle 9. These two trapezoidal threads 8 and 38 are engaged with each other. Provided on the carrier 7 are guide elements 29a, by means of which the brewing cylinder 6, together with the lower piston, is guided in a longitudinally displaceable way in the frame 2, along the spindle 9, via the linear guides 29 (FIG. 5).

Prevented in a simple way with this design of the invention is that the spindle is able to bend out under axial load arising during the brewing step, whereby prevented during the brewing step is that the lower piston is able move away from the upper piston, which would have as a consequence a change in the situation maintained during the brewing step.

The invention claimed is:

1. A brewing device for a coffee machine, comprising a single brewing cylinder with a cylindrical bore and an upper piston and a lower piston by means of which the brewing cylinder is able to be closed off to form a brewing chamber, the brewing cylinder and the pistons being held in a frame in a way displaceable along a common first axis relative to each other and being able to be driven via a drive device, which drive device comprises a spindle with a spindle axis lying parallel to and at a predetermined distance from said common first axis, provided with a trapezoidal threading, the two ends of the spindle being borne on both sides in a rotatable way in the frame, and a motor, whereby said brewing cylinder comprises a carrier with a threaded part, which engages said trapezoidal threading of the spindle on a first side of said spindle axis, and which is displaceable along said common first axis in linear guides provided in the frame, wherein a support plate is provided on a second side of said spindle axis opposite to said first side, said support plate being mounted on said frame to support said spindle against forces being exerted on said spindle by said carrier perpendicular to said spindle axis, wherein said support plate has a support surface which is turned toward the trapezoidal threading of the spindle, the support surface being provided with a curve having a smooth cylindrical surface which corresponds substantially to the outer surface of the trapezoidal threading of the spindle, wherein said support plate is provided with protrusions that protrude into recesses provided correspondingly on the frame, whereby said support plate is held in the frame via said protrusions.

2. The brewing device according to claim 1, wherein the smooth cylindrical curve of the support surface surrounds the outer surface of the trapezoidal threading of the spindle by about one fourth of the circumference of the spindle.

3. The brewing device according to claim 1, wherein the support plate is produced from a resistant plastic.

4. A brewing device for a coffee machine, comprising a single brewing cylinder with a cylindrical bore and an upper piston and a lower piston by means of which the brewing cylinder is able to be closed off to form a brewing chamber, the brewing cylinder and the pistons being held in a frame in a way displaceable relative to each other and being able to be driven via a drive device, which drive device comprises a spindle provided with a trapezoidal threading, the two ends of which are borne on both sides in a rotatable way in the frame, and a motor, in which trapezoidal threading of the spindle a threaded part engages on one side, which threaded part is disposed on a carrier provided on the lower piston and is displaceable in linear guides provided in the frame, a ground coffee feed device for filling the brewing chamber with ground coffee, and a stripping element for stripping of the ground coffee cake, ejected from the brewing chamber by the lower piston after the brewing step, into a collection vessel, wherein the spindle is supported in the region opposite the threaded part by a support plate, which is attached to the frame on both sides, and which has a support surface which is turned toward the trapezoidal threading of the spindle and wherein the support surface is provided with a curve having a smooth cylindrical surface across the entire support surface, which corresponds substantially to and surrounds the outer surface of the trapezoidal threading of the spindle, wherein the outer surface of the trapezoidal threading of the spindle is thereby supported on said curve having the smooth cylindrical surface without a large amount of friction being generated.

5. The brewing device according to claim 1, wherein the smooth cylindrical curve of the support surface surrounds the outer surface of the trapezoidal threading of the spindle by about one fourth of the circumference of the spindle.

* * * * *

UNITED STATES PATENT AND TRADEMARK OFFICE
CERTIFICATE OF CORRECTION

PATENT NO. : 8,776,672 B2
APPLICATION NO. : 12/739215
DATED : July 15, 2014
INVENTOR(S) : Christoph Wuthrich It is certified that error appears in the above-identified patent and that said Letters Patent is hereby corrected as shown below:

On the title page, in the abstract, item 57, line 11:

Please delete "remaining on the lower piston" and replace with "remaining on a lower piston"

In the claims, Column 6, line 60:

Please delete "according to claim 1" and replace with "according to claim 4"

Signed and Sealed this
Twenty-first Day of October, 2014

Michelle K. Lee
*Deputy Director of the United States Patent and Trademark Office*